Oct. 22, 1968

W. J. ROANTREE 3,406,584

DIFFERENTIAL ROLLER NUT

Filed Aug. 21, 1967

INVENTOR.
WILLIAM J. ROANTREE
BY
Albert M. Parker
ATTORNEY.

INVENTOR.
WILLIAM J. ROANTREE
BY
Albert M. Parker
ATTORNEY.

United States Patent Office 3,406,584
Patented Oct. 22, 1968

3,406,584
DIFFERENTIAL ROLLER NUT
William J. Roantree, Port Washington, N.Y., assignor to Roantree Electro-Mech Corporation, Port Washington, N.Y., a corporation of New York
Filed Aug. 21, 1967, Ser. No. 661,860
9 Claims. (Cl. 74—424.8)

ABSTRACT OF THE DISCLOSURE

A mechanism for translating rotary motion to linear motion, and having a driven lead screw and a carriage mounted on the screw. The carriage includes an internally threaded external member or nut, and at least one threaded roller rotatably mounted on the nut to travel therewith, the thread on the roller having meshing driving engagement with the threads on the nut and the screw. The effective lead of the mechanism is a function of the radius of contact of the roller relative to the external member, the radius of contact of the roller relative to the lead screw member, the radius of contact of the lead screw, the lead of the lead screw thread, and the lead of the roller thread.

The radius of the zone of the roller engaging the thread on the lead screw is made to differ from the radius of the zone of the roller engaging the thread on an external member or nut. In a first embodiment the two sets of meshing threads have flank engagement with each other, and the flank angle of the thread on the lead screw is made different from that of the thread on the external member. In a second embodiment, both sets of threads have engagement between the external surface or crest of the land of one and the root of the other.

BACKGROUND OF THE INVENTION

Field of the invention

The invention relates to a mechanism for translating rotary to linear motion, the mechanism including a lead screw, an internally threaded external member or nut surrounding and mounted coaxial of the lead screw, and one or more threaded rollers interposed between the lead screw and the external member, the thread on the roller having meshing driving engagement with the threads on the external member and the lead screw.

Description of the prior art

The present invention is an improvement upon the "Transrol" device which is currently marketed by La Technique Integrale, of Paris, France, such prior device being covered by U.S. Patent No. 2,683,379 to Strandgren. In the present device the profiles of the two sets of engaging threads are different, rather than the same, as in Strandgren, so that the present device more efficiently translates heavy loads with very small effective leads. The present device accomplishes in a simplified manner the goal set out in the U.S. Patent to Perrin, No. 3,214,991, assigned to La Technique Integrale, and eliminates the parasitic slip referred to in the Perrin patent.

Summary of the invention

In a first embodiment, disclosed in FIGS. 1, 2, and 3, the device consists of an external member with four internal righthand threads, six single right-hand threaded rollers, a double threaded left-hand lead screw, and the associated elements to maintain the proper phase relationship. Normally this particular combination of elements would render a device with an effective lead of zero due to the fact that the contact diameter of the lead screw is exactly twice that of the rollers. In the subject device this ratio is changed by changing the flank angle of the lead screw so that the contact point is shifted away from the normal point. By shifting the contact point in this manner the rotational speed ratio between the rollers and the lead screw is changed and a finite effective lead results.

The effective lead of the device may be changed to a greater degree by changing the basic thread profile of the system. One such alternative device is shown in FIG. 4, wherein the thread on the external member and the thread on the roller have root-crest contact, and the thread on the lead screw, and the thread on the roller likewise have crest-root contact.

In both embodiments, the amount of the effective lead ($L_e$) is a function of the amount of the contact point shift and can be calculated from the following formula:

$$L_e = \left[\frac{(R_{rl})^2 + R_{rl}R_1 + R_{rl}R_{re}}{(R_{rl}+R_{re})(R_1+R_{rl})}\right]\left[L_1 + \frac{R_1}{R_{rl}}L_r\right]$$

where:

$L_e$=the effective lead of the device (the amount of translation in one revolution of the lead screw);
$R_{re}$=radius of contact of the roller relative to the external member;
$R_{rl}$=radius of contact of the roller relative to the lead screw member;
$R_1$=radius of contact of the lead screw;
$L_1$=lead of the lead screw thread; and
$L_r$=lead of the roller thread.

The lead is the product of the pitch and the number of threads; right-hand threads are considered positive, and left-hand threads are considered negative.

In accordance with the invention, the effective lead of the device can be altered by small amounts by a suitable choice of parameters. In other words, the amount of effective lead of any similar device can be altered by design to render a slightly different effective lead. This aids in the standardization of the basic device, since it allows the manufacturers to stock standard combinations of external members and rollers and yet to fill most needs by simpuly custom fabrication of the lead screw.

Brief description of the drawing

In the drawings, wherein like reference characters refer to like parts throughout the several views.

Description of the preferred embodiments

Figure 1:
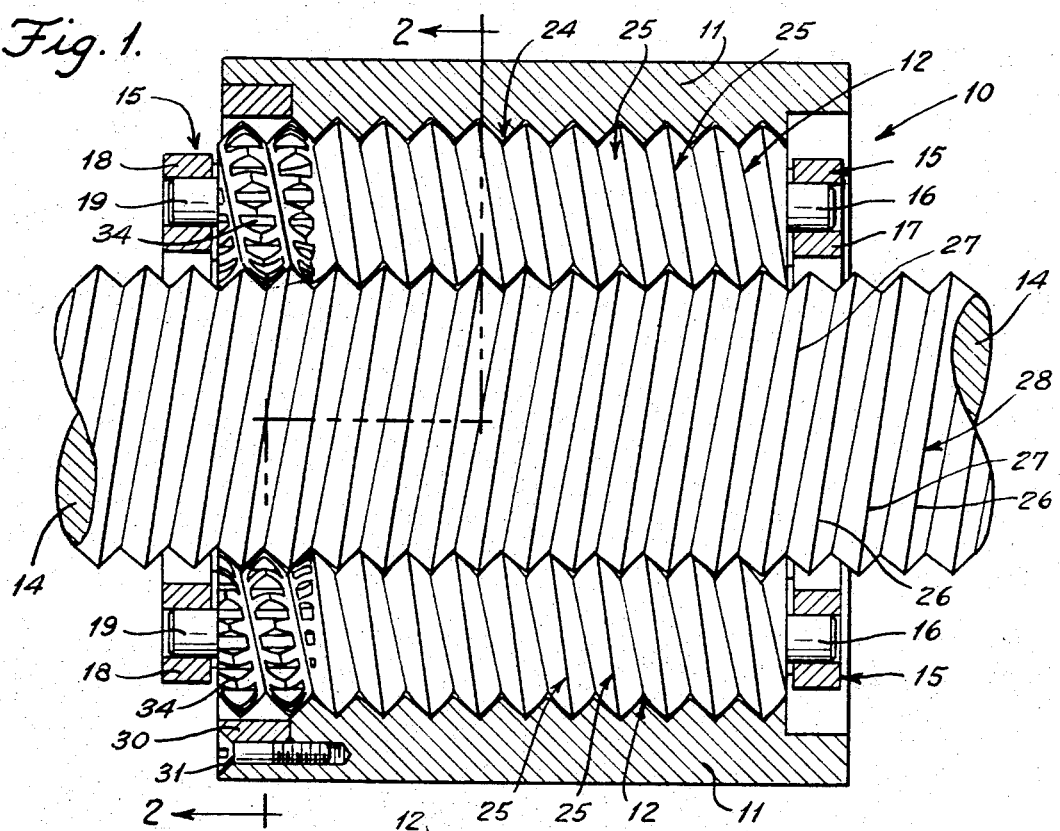
FIG. 1 is a view in longitudinal axial section through a first embodiment of mechanism in accordance with the invention, certain of the parts being shown in elevation.
Figure 2:
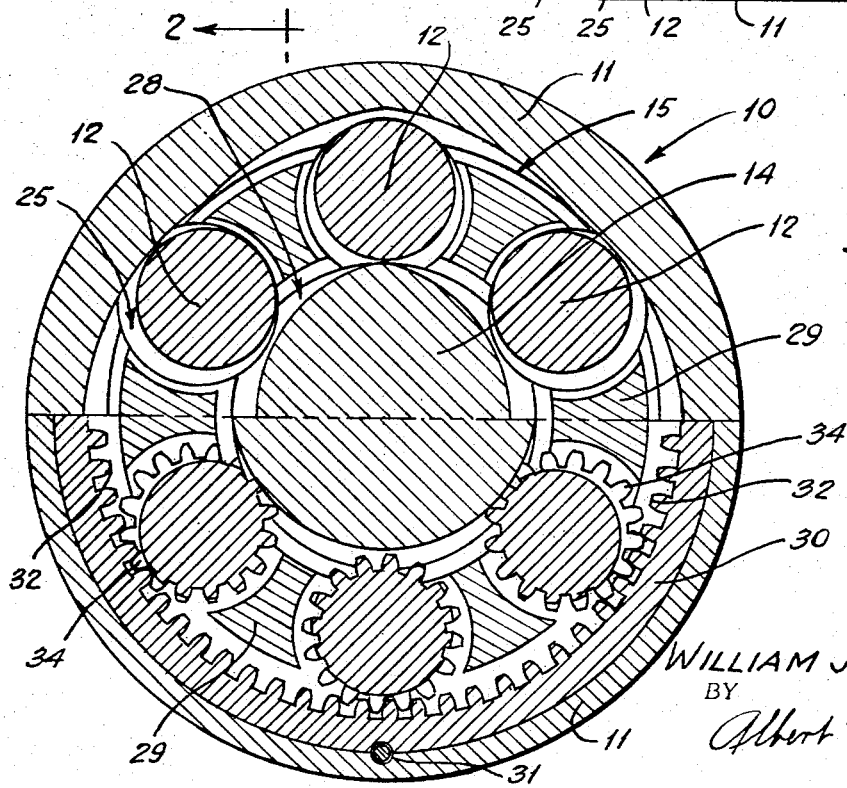
FIG. 2 is a view in transverse section through the mechanism of FIG. 1, the section being taken along the broken section line 2—2 of FIG. 1 looking in the direction of the arrows.

As is apparent from the above, two embodiments of mechanism in accordance with the invention are disclosed herein. The first such embodiment is shown in FIGS 1–3, inclusive; the second embodiment is shown in FIG. 4.

Turning now to the drawings, the first embodiment of differential roller nut mechanism in accordance with the invention is designated generally by the reference character 10. Such mechanism includes an external member 11 in the form of an internally threaded sleeve, threaded rollers 12 disposed within the sleeve 11 and having the threads thereof in meshing driving engagement with those on the member 11, and a lead screw 14 which is disposed coaxially of the member 11 and has the threads thereon in meshing driving engagement with those of the rollers 12. The lead screw is held against axial movement and is rotatably driven by power means not shown, the external member 11 being held from rotation about its axis by guide means which permits the external member to travel along the screw while preventing rotation of the external member. The external member is adapted to be connected to a loading device whereby to move the device linearly at greatly reduced speed upon rotation of the lead screw.

Six similar rollers 12 are shown, such rollers being disposed with their axes parallel and parallel to the axes of the external member 11 and the lead screw 14. The rollers 12, which are equally angularly spaced about the axis of the screw 14, are maintained in the described position by means of a cage 15 which is disposed within the external member 11 and travels therewith longitudinally of the screw 14. No means additional to those shown need be provided to maintain the rollers 12 axially within the external member 11, although if desired the member 11 may be provided with radially inwardly extending flanges at its ends closely overlying the ends of the cage 15. The cage 15 is composed of end plate members 17, 18 which are connected by longitudinally extending struts 29 which are disposed between and spaced from successive pairs of rollers 12, as more clearly shown in FIG. 2. The right-hand end of each of the rollers 12 is provided with an axially extending stub shaft 16 which is journalled in a bearing in the end plate 17. Each of the rollers 12 is also provided with a stub shaft 19 at its left-hand end, shaft 19 being journalled in a bearing in the end plate 18.

Figure 3:
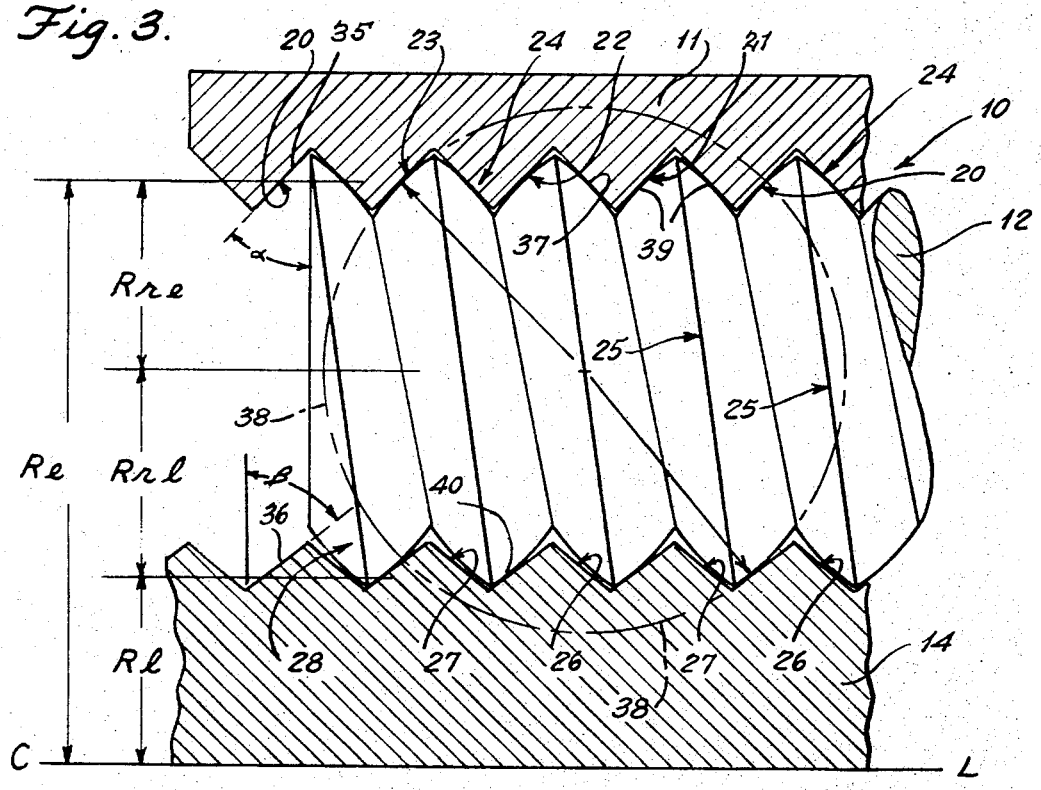
FIG. 3 is a fragmentary view on an enlarged scale of portions of a roller, the external member, and the lead screw, the roller being shown in elevation and the external member and lead screw being shown in longitudinal axial section.
Figure 4:
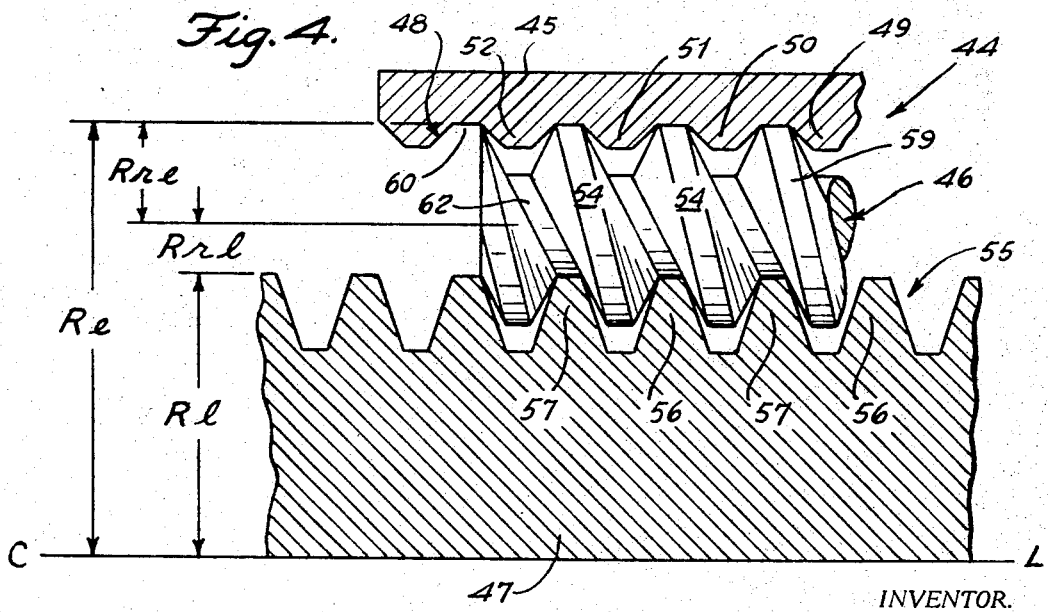
FIG. 4 is a fragmentary view similar to FIG. 3 of a second embodiment of the mechanism of the invention.

The thread 24 on the inner surface of the member 11 is in this embodiment a right-hand quadruple thread, that is, one made up of four single threads 20, 21, 22, and 23, as is more clearly shown in FIG. 3. Each roller 12 has a single right-hand thread 25 thereon, the thread 25 meshing with the four threads of the quadruple thread 24 as shown. The lead screw 14 has a double left-hand thread 28 thereon, such double thread being formed of the two single threads 26 and 27 which mesh with the single thread on each of the differential rollers.

In order to maintain the rollers 12 in synchronism or in phase as they rotate, the mechanism 10 is provided with means positively drivingly connecting the rollers together and to the external member 11. Such synchronizing or phasing mechanism includes a ring gear 30 which is affixed to the left-hand end of the external member 11 by a plurality of machine screws of which one is shown at 31 in FIG. 1. The threads at the left-hand end of each of rollers 12 are cut axially to form pinions 34 thereon, such pinions meshing with the teeth 32 on the inner periphery of the ring gear 30. The pitch diameters of the ring gear 30 and of the pinions 34 are such that as the lead screw rotates about its axis, the rollers 12 are forced by the gear means 30, 34 to rotate in synchronism so that they are maintained in phase at all times; thus no binding occurs between the threads 25 on the rollers and the thread 24 on the external member 11.

As shown in FIG. 3, the thread 24 on the external member 11 and the thread 28 on the lead screw 14 are of V-shaped profile. In the thread 24 radial axial elements or flanks 35 of the thread make an angle $\alpha$ with transverse planes normal to the axis of the member 11. In the thread 28 on the lead screw 14 radial axial elements or flanks 36 make an angle $\beta$ with respect to radial axial planes normal to the axis of the lead screw. In the embodiment shown the angle $\beta$ is somewhat larger than the angle $\alpha$; typical values of such angles in the embodiment shown are $\alpha = 45°$ and $\beta = 50°$.

The thread 25 on the rollers 12 has flanks which are convex in radial axial section, the thread 25 specifically shown having flanks of which radial axial elements 37 lie upon circles 38 disposed in radial axial planes through the respective roller 12.

Because of the described configuration of the threads 24, 25, and 28, the thread 25 engages the thread 24 at a series of axially spaced points 39, and the thread 25 engages the thread 28 at a series of axially spaced points 40, the two series of points of contact lying substantially in the same diametral axial plane through the roller. It will be seen in FIG. 3 that the radius of contact $R_{rl}$ with respect to the roller 12 between its thread 25 and the thread 28 on the lead screw is somewhat greater than the radius of contact $R_{re}$ with respect to the roller 12 between the flanks of the thread 25 thereon and the flanks of the thread 24 on the external member 11. As set forth above, by suitable changes in the profiles of the respective meshing threads the ratio between the contact diameter of the lead screw and that of the differential rollers 12 may be changed between substantially spaced limits as required by the particular use to which the invention is to be put.

In the second illustrative embodiment, shown in FIG. 4 and there designated generally by the reference character 44, the external member is designated 45, the lead screw 47 and the one or more rollers disposed between and drivingly engaged with members 45 and 47 is designated 46. As in the first embodiment, the thread 48 on the external member 45 has a right-hand quadruple lead and is made up of four single threads which are here designated 49, 50, 51, and 52. The thread on the differential roller 46 is a righthand single thread, such thread being designated 54. The thread 55 on the lead screw 47 is a left-hand double thread made up of two single threads 56 and 57.

The embodiment of FIG. 4 differs from that of FIGS. 1–3, inclusive, not only by the different profiles of the threads, all the threads in FIG. 4 being of the modified Acme type, but also by reason of the different type of engagement between the members. Thus the thread 54 on the differential roller has the radially outer surfaces of the lands lying on a circular cylinder coaxial with the roller and the radially inner surfaces 62 or roots of the grooves between the lands lying on a second smaller diametered circular cylinder coaxial with the roller. Both the outer surfaces of the lands and the roots of the grooves are of substantial axial width. The angle which the flank of threads 48 on the external member 45 makes with planes normal to the axis of member 45 is substantially greater than that of the thread 54. The axial width of the roots 60 of the grooves of thread 48 is at least equal to that of the lands of thread 54 so that such lands are freely received within the grooves and have rolling contact therewith.

Driving engagement between the thread 54 on the differential roller 46 and the threads 55 on the lead screw 47 takes place between the roots of the grooves of thread 54 and the radially outer surfaces of the lands making up the thread 55. As shown in FIG. 4, the radius with respect to the differential roller 46 of the zones of contact between the roller and the external member 45 is designated $R_{re}$. The radius with respect to the roller 46 of the zone of contact between the roller and the lead screw 47 is designated $R_{rl}$. $R_{re}$ is substantially greater than $R_{rl}$. It will be apparent that the values $R_{re}$ and $R_{rl}$ may be varied widely with respect to each other so that the effective lead of the device may be made to have the desired value.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. A mechanism for converting rotary motion to linear motion, said mechanism comprising a driven rotatable lead screw, an annular external member surrounding the lead screw and mounted coaxial thereof, the external member being internally threaded, and at least one threaded roller interposed between the lead screw and the external member, the thread on the roller having meshing driving engagement with the threads on the lead screw and external member, the thread on the roller engaging the thread on the external member at zones lying substantially on a first circular cylinder lying coaxial of the roller, the thread on the roller engaging the thread on the lead screw at zones lying substantially on a second circular cylinder lying coaxial of the roller, said first and second cylinders having substantially different diameters.

2. A mechanism as claimed in claim 1, wherein the diameter of the second cylinder substantially exceeds that of the first cylinder.

3. A mechanism as claimed in claim 1, wherein the roller travels axially of the lead screw with the external member, and comprising means journalling the roller for rotation about its axis while retaining the roller from axial travel with respect to the external member.

4. A mechanism as claimed in claim 3, comprising a plurality of rollers similarly journalled, said rollers being spaced angularly about the axis of the lead screw, and means drivingly connecting the rollers to maintain them in synchronism as they rotate.

5. A mechanism as claimed in claim 4, wherein the means drivingly connecting the rollers is fixed to the external member to maintain the threads on the rollers in accurate driving engagement with the thread on the external member.

6. A mechanism as claimed in claim 1, wherein the threads on the lead screw and external member are of V-shaped profile, the thread on the roller has flanks which are convex in radial axial section, and the lands of the thread on the roller have flank to flank engagement substantially at points with the lands of the threads on the lead screw and the external member.

7. A mechanism as claimed in claim 6, wherein the thread on the roller has flanks which are circular in radial axial section.

8. A mechanism as claimed in claim 1, wherein the threads on the lead screw, roller, and external member have profiles which are all different from each other.

9. A mechanism as claimed in claim 8, wherein the outer surfaces of the lands on the one thread and the roots of the grooves on the other thread have substantially axial length and lie on circular cylinders coaxial with the members bearing the respective threads.

References Cited

UNITED STATES PATENTS

| 2,683,379 | 7/1954 | Strandgren. |
| 3,173,304 | 3/1965 | Standgren _____ 74—459 |
| 3,214,991 | 11/1965 | Perrin. |

FRED C. MATTERN, JR., *Primary Examiner.*

L. H. GERIN, *Assistant Examiner.*